(12) United States Patent
Dutton

(10) Patent No.: US 6,322,306 B1
(45) Date of Patent: Nov. 27, 2001

(54) ANTI-ROTATION CLIPS

(75) Inventor: Colin George Dutton, St. Hubert (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 09/444,311

(22) Filed: Nov. 22, 1999

(51) Int. Cl.[7] ................................................. F16B 39/10
(52) U.S. Cl. ........................ 411/121; 411/120; 411/234; 81/13
(58) Field of Search ..................................... 411/119, 120, 411/121, 111, 112, 233, 234, 235; 81/10, 13

(56) References Cited

U.S. PATENT DOCUMENTS

| | | |
|---|---|---|
| Re. 30,559 | 3/1981 | Schmitt . |
| 126,223 | 4/1872 | Morrison . |
| 339,758 | 4/1886 | Ganoe . |
| 408,320 * | 8/1889 | Powell ................................. 411/121 |
| 539,692 * | 5/1895 | Lister .................................. 411/121 |
| 656,151 * | 8/1900 | Bartley ................................ 411/121 |
| 987,705 * | 3/1911 | Dietrich .............................. 411/235 |
| 1,134,274 * | 4/1915 | Johnson .............................. 411/234 |
| 2,189,654 * | 2/1940 | Rief ..................................... 411/121 |
| 2,578,608 | 12/1951 | Shull . |
| 2,642,108 | 6/1953 | Geistert . |
| 3,420,287 * | 1/1969 | McCormick ....................... 411/121 |
| 3,881,753 | 5/1975 | Bochory . |
| 3,945,669 | 3/1976 | Bochory . |
| 4,230,109 | 10/1980 | Geiss . |
| 4,539,003 | 9/1985 | Tucker . |
| 4,826,486 | 5/1989 | Palsrok et al. . |
| 4,887,949 | 12/1989 | Dimmick, III et al. . |
| 4,940,373 | 7/1990 | Specktor . |
| 5,085,548 | 2/1992 | Moyles . |
| 5,312,139 * | 5/1994 | Marks .................................. 411/120 |
| 5,350,201 | 9/1994 | Bynum . |
| 5,388,866 | 2/1995 | Schlosser . |
| 5,820,168 | 10/1998 | De Giacomoni . |

FOREIGN PATENT DOCUMENTS

1081784 * 8/1967 (GB) ................................... 411/119

* cited by examiner

*Primary Examiner*—Flemming Saether
(74) *Attorney, Agent, or Firm*—Jeffrey W. Astle

(57) ABSTRACT

An anti-rotation clip is adapted to be attached to a fastener or connector assembly to ensure the tightened threaded connection of the assembly. The anti-rotation clip in one embodiment of the invention includes one or more co-axial clips to radially and forcibly grip one or more hexagonal parts rotatable to a body, and a pair of tang members extending from one clip to engage a pair of grooves having flat bottoms on the body to prevent the hexagonal parts from rotation and the clip from axially moving away relative to the body. In another embodiment of the invention, two co-axially connected clips are adapted to radially and forcibly grip two connectors, having hexagonal exteriors, which are in a tightly threaded connection to a body and may be loosened in opposite rotary directions. The two clips lock the two connectors together to prevent the loosening of either one. An axially spaced apart tang member restrains a flange member on the body to prevent the clip from displacement from its axial position. The anti-rotation clip is simple in structure, easy for use and no plastic deformation is required during installation so that stress concentration is avoided which is especially good for aerospace applications.

14 Claims, 3 Drawing Sheets

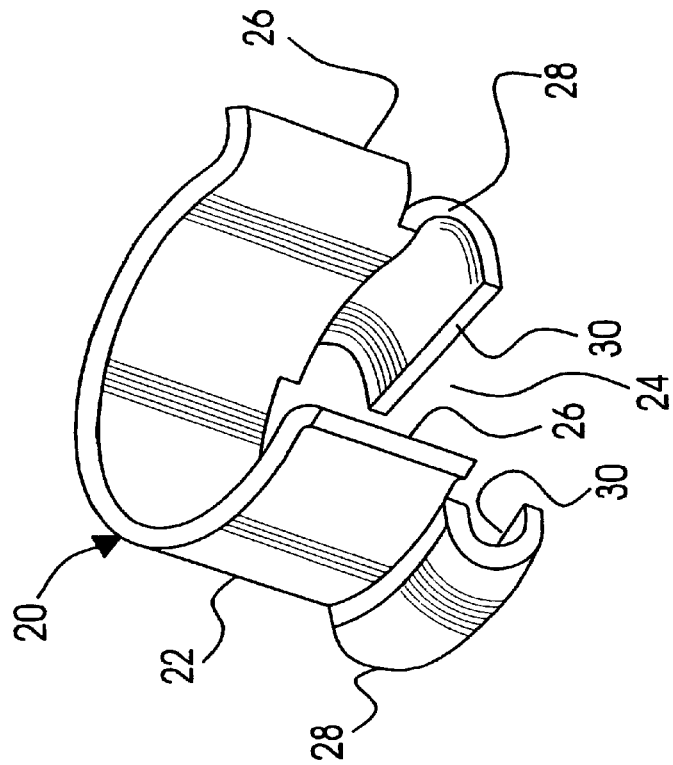
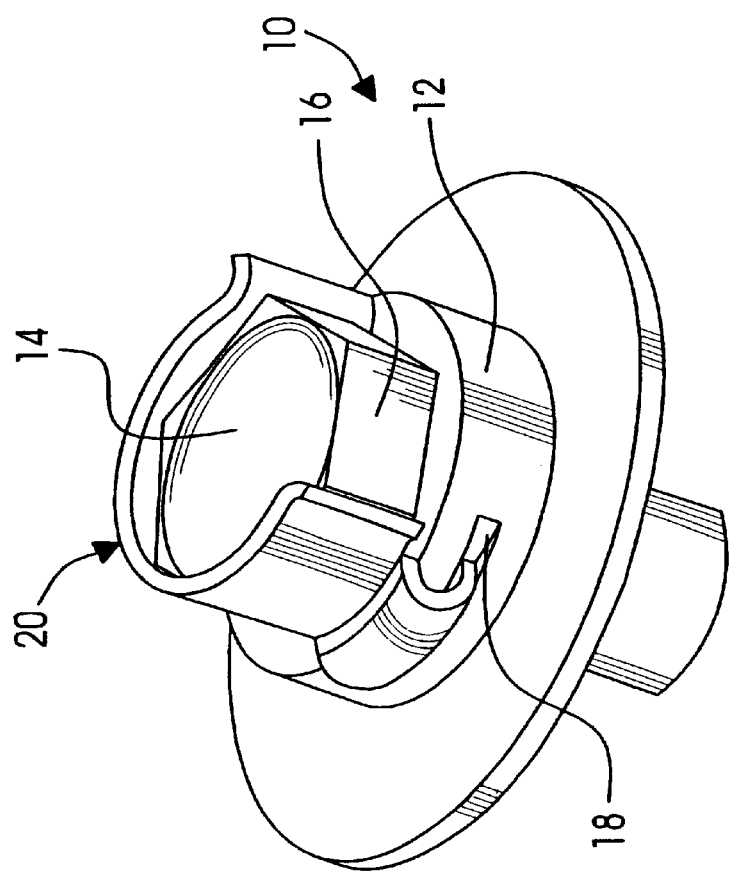
FIG. 1b
FIG. 1a

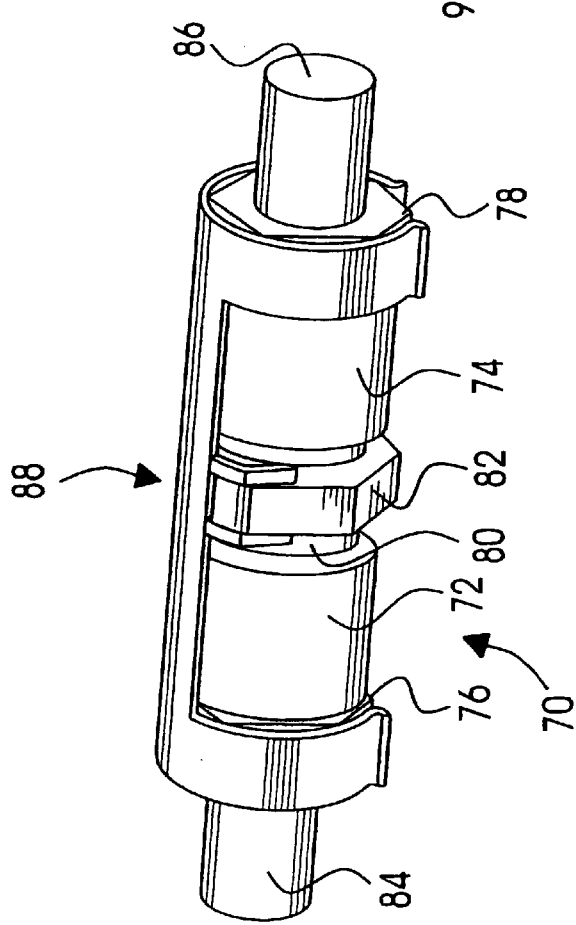

ANTI-ROTATION CLIPS

TECHNICAL FIELD

The invention relates to fastening mechanisms and, in particular, to external secondary locking mechanisms to prevent the relative rotation and loosening of various separable connectors or fasteners, most commonly threaded connectors or fasteners.

BACKGROUND OF THE INVENTION

The secondary locking mechanisms to prevent the relative rotation and loosening of various separable connectors or fasteners have been developed over a long period of time, and different types of mechanisms have been created for various applications. In aerospace applications, anti-rotation features are important and external secondary locking mechanisms are widely used in different structures. In an assembly of rotating equipment such as gas turbine engine fans, for example, there are occasions where blind assembly of bolts would be required. In such situations, the head of the bolt cannot be reached at the time that components to be joined are installed, when applying a nut, or when tightening a nut. Various clips and retaining means are known to retain a bolt at such time. In other situations, external secondary locking mechanisms are used for locking connectors that join tubes, hoses and wiring together or to an accessory unit. The requirements for aerospace applications are particularly stringent, in particular, for use on engines, hydraulic systems, fuel systems and electrical cable connectors. The current and most common means for secondary locking of aerospace connectors or fasteners are lock wires and safety wires which require special features to be incorporated in the connectors or fasteners. Other means comprise crimp nuts, fibre nuts and tab washers. These external locking devices may permit some small relative rotation of the connectors or fasteners, and usually are destroyed or rendered non-reusable in aerospace applications, once unlocked to open the connectors or unfasten the fasteners.

With high speed rotating equipment, high stresses are formed and notches, scratches or plastic deformation forms stress concentrations. Any such stress concentration can cause failure during the operation of the apparatus. It is therefore desirable that any external secondary locking mechanism not require a basic component design having a substantial stress concentration. Lightweight is also important in such high-speed rotating equipment and, accordingly, a lightweight, simply construed secondary locking mechanism is desired. Efforts have been made to improve external secondary locking mechanisms in aerospace applications and one example is shown in U.S. Pat. No. 5,350,201, entitled SEPARABLE CONNECTOR EXTERNAL CAPTURE DEVICE and issued to K. K. Bynum on Sep. 27, 1994. Bynum describes an external capture device having two co-axial spring clips sized to tightly grip the external surfaces of the separable connector to be secured. Each clip is a semi-circular spring band and serrated in form and joined by an axial bar. In another example, Dimmick III et al. describe in U.S. Pat. No. 4,887,949, which is entitled BOLT RETENTION APPARATUS and issued on Dec. 19, 1989, a retention clip co-operating with a bolt and a flange through which the bolt passes to retain the bolt during blind assembly.

SUMMARY OF THE INVENTION

One object of the invention is to provide an anti-rotation clip which is simply constructed and easy for use.

Another object of the invention is to provide an anti-rotation clip which can be used for two or more separable connectors or fasteners in an assembly to prevent the same from rotation relative to one another or to a body which supports the connectors or fasteners.

In accordance with one aspect of the invention, there is provided an anti-rotation clip device which comprises:

at least one clip made of a spring band forming a circular and circumferentially discontinuous annulus having a circumferentially open portion of less than 180°, adapted to radially and forcibly grip a polyhedral element of a first object when the polyhedral element is laterally and forcibly captured therein, through the circumferentially open portion of the clip; and the clip having a first tang member fixed to the clip, the tang member including a laterally and inwardly facing end, the end being flat along substantially its entire face, adapted to abut a flat surface on a body to which the first object is rotatably connected so that relative rotation between the first object and the body is inhibited.

The first tang member preferably extends from the spring band and the flat end of the tang member is adapted to be received in a groove having a flat bottom on the body to prevent the first object from rotation and the device from axial movement relative to the body.

In an embodiment of the invention, it is preferred that the spring band include a second tang member which is similar to the first tang member and diametrically opposed to the first tang member, and adapted to engage a second groove having a flat bottom on the body to ensure the prevention of the object from rotation and the device from axial movement relative to the body.

In another embodiment of the invention, the anti-rotation clip device includes two spaced apart clips co-axial about a common axis. Each of the clips is a circumferentially discontinuous annulus, forming a circular and circumferentially open portion of less than 180°. A polyhedral element of either one of two objects in an assembly can be laterally and forcibly captured through the open portion of a corresponding one of the clips, and each clip is enabled to radially and forcibly grip the polyhedral element. Each clip is made of a spring band with two ends bent outwardly to facilitate the insertion of the polyhedral element of the object. A connection bar formed integrally with the spring bands rigidly interconnects the two clips at their middle portions so that relative rotary and linear movement between the two clips are restrained. Two tang members fixed to and axially spaced apart from one of the open clips are diametrically opposed and symmetrical about the connection bar. Each tang member includes a laterally and inwardly facing end, the end being flat along substantially its entire face, adapted to abut a flat surface on a body to which the respective objects are rotatable connected so that relative rotation between each object and the body is inhibited. Furthermore, two sides of each tang member are adapted to co-operate with two corresponding surfaces on the body to prevent the device from axial movement relative to the body.

In accordance with another aspect of the invention, an anti-rotation clip includes at least two spaced-apart clips co-axial about a common axis, each clip being a circular and circumferentially discontinuous annulus, forming a circumferentially open portion of less than 180°. A polyhedral element on either one of two objects which are threadedly connected to a body respectively can be laterally and forcibly captured through the open portion of a corresponding one of the clips. Each clip therefore is enabled to radially and forcibly grip the polyhedral element. Each clip is made of a spring band with two ends bent outwardly to facilitate the forcible insertion of the polyhedral element on the object. A connection bar formed integrally with the spring bands rigidly interconnects the two clips at their middle portions to restrain relative rotary and linear movements between the two clips so that the two objects which are rotatable relative to each other are prevented from relative rotation when they are forcibly gripped by the respective clips. At least one pair of axially spaced apart tang members are fixed to either side of the connection bar between the two clips and enabled to axially restrain within a space therebetween a flange member on the body so that the device is prevented from axial movement relative to the objects.

No special tools are required for the anti-rotation clip device to be added to or removed from a closed connector, or a fastener assembly. The secure attachment of the clip device is ensured by the resilient force. There is no plastic deformation of any part of the device during installation, which renders the device a re-usable feature and avoids failure resulted from stress concentration. Other features and advantages will be more clear in the detailed description of the embodiments of the invention.

BRIEF DESCRIPTION OF THE DRAWINGS

Having thus generally described the nature of the invention, reference will now be made to the preferred embodiments thereof and the accompanying drawings, shown by way of illustration, in which:

FIG. 1a is a perspective view of a single anti-rotation clip according to a preferred embodiment of the invention which is attached to a fastener assembly;

FIG. 1b is a perspective view of the embodiment in FIG. 1a, showing the structural detail thereof;

FIG. 3a is a gang anti-rotation clip according to a further preferred embodiment of the invention, which is attached to a connector assembly;

FIG. 3b is a perspective view of the embodiment in FIG. 3a, showing the structural detail thereof.

DETAILED DESCRIPTION OF THE PREFERRED EMBODIMENT

Figure 2:
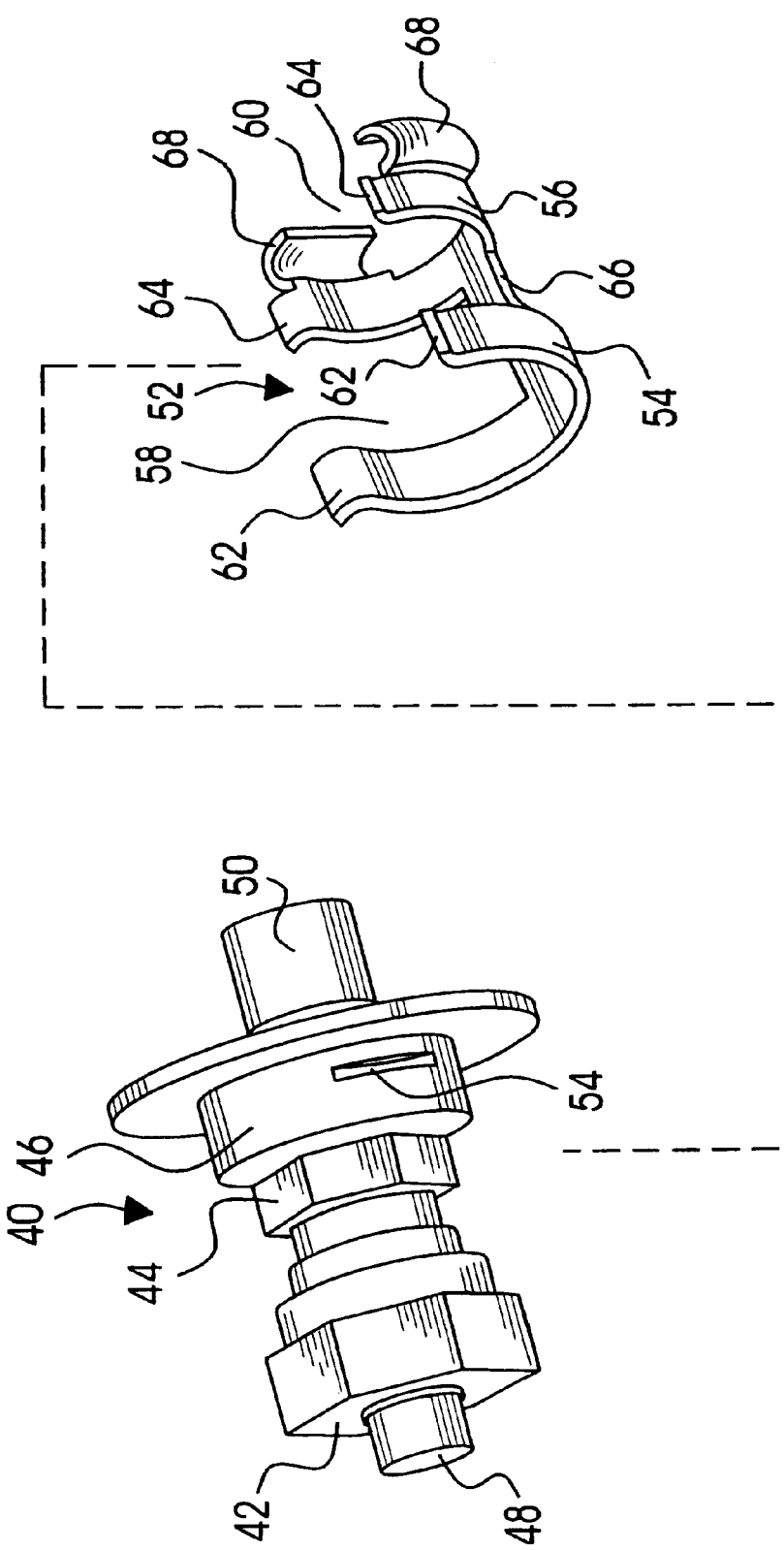
FIG. 2 is an exploded perspective view of a double anti-rotation clip according to another preferred embodiment of the invention, which is to be attached to a connector assembly.

Illustrated in FIG. 1a, is a fastener assembly 10 which includes a body portion 12 having a central threaded bore (not shown) for receiving a bolt 14 in threaded connection. The bolt 14 includes a hexagonal head portion 16 which is radially and forcibly gripped by a single anti-rotation clip 20 and the anti-rotation clip 20 itself is restrained by two grooves 18 (only one is shown) on the body portion 12 so that the rotation of the bolt 14 relative to the body portion 12 is prevented. The fastener assembly 10 could be a connector joint assembly in which the body portion might be a casing or a base portion, and the bolt 14 might be a fitting with an hexagonal exterior portion. This is immaterial to the application of the single anti-rotation clip 20, and is an example only for illustration of the application of the anti-rotation clip 20.

The single anti-rotation clip 20 is more clearly shown in FIG. 1b. The single anti-rotation clip 20 includes a clip made of a spring band 22 forming a circumferentially discontinuous annulus with a circumferentially open portion 24 less than 180°. The spring band 22 is radially sized to engage the hexagonal head portion 16 of the bolt 14 and enabled to radially and forcibly grip the hexagonal head portion 16 when the hexagonal head portion 16 of the bolt 14 is laterally and forcibly inserted through the open portion 24 into engagement within the clip 20. The radial spring force applied by the spring band 22 to the hexagonal head portion 16 of the bolt 14 tightly holds the bolt 14 and restrains the rotation of the bolt with respect to the clip 20. The two ends 26 of the spring band 22 are bent outwardly to facilitate the insertion of the hexagonal head portion 16 of the bolt 14.

Two tang members 28 integrally extend from one side of the spring band 22. The tang members 28 are diametrically opposed, and circumferentially and equally spaced apart from the two respective bent ends 26. Each tang member 28 smoothly extends outwardly and then inwardly to form a hook with a flat end 30 which is axially spaced apart from the spring band 22 and extends towards its counterpart. The two flat ends 30 of the tang members 28 slide into the respective grooves 18 on the body portion 12 when the hexagonal head portion 16 of the bolt 14 is inserted through the open portion 24 into the clip 20. The flat end 30 abuts a flat bottom of the groove 18 to restrain the clip 20 from rotation relative to the body portion 12 and, therefore, the rotation of the bolt 14 relative to the body portion 12 is prevented. The flat end 30 of the tang member 28 is also restrained by the side walls of the groove 18 in its axial position to prevent axially moving away from the assembly 10, which might be caused otherwise by vibration or impact during an operation condition of a machine, such as a turbine engine in which the assembly 10 is installed. The single anti-rotation clip can be used to lock a tightened connector or fastener assembly as well as to retain a bolt in blind assembly as described in U.S. Pat. No. 4,887,949.

Illustrated in FIG. 2 is a connector joint assembly 40 typically used in the aircraft industry. The connector joint assembly 40 includes a first hexagonal portion 42, a second hexagonal portion 44 and a body portion 46 which are rotatable relative to one another and form a threaded joint to retain a first tube 48 and second tube 50 tightly together. Although fully and properly tightened, such a connector joint assembly 40 can inevidently loosen as a result of severe vibration or impact. The connector joint assembly 40 may also be routinely opened and re-tightened during maintenance procedures. Therefore, a double anti-rotation clip 52 is to be attached to the connector joint assembly 40 to ensure the tightened connection. A pair of grooves 54, only one shown, are provided on the body portion 46 to engage the double anti-rotation clip 52.

The double anti-rotation clip 52 includes two open and spaced-apart clips made of a spring band 54 and 56, and each is a circumferentially discontinuous annulus having a circumferentially open portion 58 and 60 less than 180°. The spring bands 54 and 56 are co-axial about a common axis and the open portion 58 and 60 are oriented in the same direction so that the first and second hexagonal portion 42 and 44 are enabled to be laterally and forcibly inserted through the respective open portions 58 and 60 into the two clips. The spring bands 54 and 56 are radially sized to the respective first and second hexagonal portion 42 and 44 and enabled to radially and forcibly grip the first and second hexagonal portions 42 and 44. The radial spring force applied by the spring bands 54 and 56 to the respective first and second hexagonal portion 42 and 44 tightly holds the first and second hexagonal portions 42 and 44 in position and the rotation thereof respective to the clips are prevented, as described in the embodiment shown in FIGS. 1a, and 1b.

Each of the spring band 54 and 56 includes two ends 62, 64 outwardly bent to facilitate the insertion of the first and second hexagonal portions 42 and 44. A connection bar 66 is integrally formed with the spring bands 54 and 56 to rigidly interconnect the two open clips at their middle portions so that relative rotary and linear movement between the two clips are restrained. The connection bar has an appropriate length to enable the two spring bands 54 and 56 to be axially spaced apart in accordance with the space between the first and second hexagonal portions 42 and 44. The width of the connection bar is substantially the same as the width of each spring band 54, 56.

A pair of tang members 68 are fixed to the outer side of the spring band 56, which is exactly identical in structure and function to the tang members 28 of the embodiment in FIGS. 1a and 1b. In order to avoid redundancy, the tang members 68 are not described with detail. However, it is apparent to those skilled in the art that the rotation of either or both of the first and second hexagonal portions 42 and 44 relative to the body portion 46 is prevented when the first and second hexagonal portions 42 and 44 are radially and forcibly gripped by the respective spring bands 54 and 56, and the tang member 68 is engaged in the flat-bottomed grooves 54 on the body portion 46. The double anti-rotation clip 52 itself is prevented from axially moving away from the connector joint assembly 40 by the tang members 68 engaged in the grooves 54.

In FIG. 3a, another type of connector joint assembly 70 used in the aircraft industry is illustrated. The connector joint assembly 70 includes a first sleeve portion 72 and a second sleeve portion 74, and each of the sleeve portions 72, 74, has a hexagonal exterior portion 76, 78, suitable for engagement by a wrench to tighten or loosen the connector. A hollow body 80 surrounded by a hexagonal nut 82 is threadedly connected at each end to the first and second sleeve portions 76, 78 to tightly hold a first tube 84 and a second tube 86 together. The hexagonal nut 82 is fixed to the hollow body 80 so that when the nut 82 is held by a wrench, the first or second sleeve portion 72 or 74 can be rotated to be tightened or loosened by another wrench engaging the hexagonal exterior portion 76 or 78. A gang anti-rotation clip 88 is attached to the connector joint assembly 70 to ensure the tightened engagement of the assembly, preventing either one of the sleeve portions 72, 74 from rotation relative to the hollow body 80.

The gang anti-rotation clip 88 is now described with reference to FIG. 3b. Similar to the second embodiment, the double anti-rotation clip 52, the gang anti-rotation clip 88 includes two clips, and each is made of a spring band 90, 92 forming a circumferentially discontinuous annulus having a circumferentially open portion 94, 96 less than 180°. The two spring bands 90 and 92, co-axial about a common axis, are axially spaced-apart from each other and rigidly connected by a connection bar 98 which extends from the middle portion of the spring band 90 to the middle portion of the spring band 92. Therefore, the two clips are substantially prevented from relative rotary and linear movement. The length of the connection bar 98 is substantially equal to the distance between the two hexagonal exterior portions 76, 78 and the open portions 94, 96 are oriented in the same direction to enable the two hexagonal exterior portions 76, 78 to be laterally and forcibly inserted through the open portions 94, 96 into the clips. Each of the spring bands 90, 92 has two ends bent outwardly to facilitate the insertion.

The spring bands 90, 92 are radially sized to the corresponding hexagonal exterior portion 76, 78 so that the spring bands 90, 92 radially and forcibly grip the respective hexagonal exterior portions 76, 78 to prevent the sleeve portions 72 and 74 from rotation relative to the gang anti-rotation clip 88. In order to prevent the tang anti-rotation clip 88 from axial displacement with respect to the hexagonal exterior portions 76, 78, two pair of integral tang members 104 and 106 are provided. The two tang members 104 extend radially and inwardly from one side of the connection bar 98, and are axially spaced apart from each other. The space between the tang members 104 and the axial position thereof match the geometry of the connector joint assembly 88 to enable the hexagonal nut 82 to fit into the space between the two tang members 104. The other pair of tang members 106 are similar to the tang members 104, and extend from the opposite side of the connection bar 98.

Having thus structured, the tang members 104, 106 do not restrain the rotation of the gang anti-rotation clip 88 relative to the body portion 80 and the hexagonal nut 82, and the first and second sleeve portions 72, 74 may rotate together with the gang anti-rotation clip 88 relative to the body portion 80 and the hexagonal nut 82. However, in practical applications, this does not happen. Each of the sleeve portions 72 and 74 is tightened in threaded connection to the hollow body portion 80, and able to be rotated relative to the body portion 80 in one direction only to loosen the connection. The rotary direction of the sleeve portion 72 for loosening the threaded connection is opposite to the rotary direction of the sleeve portion 74 for loosening the threaded connection.

Therefore, when the gang anti-rotation clip 88 is attached to the connector joint assembly 70, the rotation of the sleeve 72 for loosening the threaded connection will cause the sleeve portion 74 to rotate for further tightening of the threaded connection. The rotation for further tightening the sleeve portion 74 could not happen and, therefore, the rotation of the sleeve portion 72 for loosening the threaded connection is stopped.

The invention is illustrated by three preferred embodiments as examples only and is not limited to the described embodiments. For example, three or more clips may be included in the embodiments described as the double-rotation clip or gang anti-rotation clip, depending on various applications.

Any changes or modifications to the embodiments hereinbefore described can be made without departing from the scope of the invention which is intended solely by the scope of the appended claims.

What is claimed is:

1. An anti-rotation clip device comprising:
   at least one clip made of a spring band forming a circular and circumferentially discontinuous annulus having a cirferentially open portion of less than 180°, adapted to radially and forcibly grip a polyhedral element of a first object when the polyhedral element is laterally and forcibly captured therein through the circumferentially open portion of the clip; and
   a first tang member fixed to the clip, the tang member including a laterally and inwardly facing end, the end being flat along substantially its entire face, adapted to abut a flat surface on a body to which the first object is rotatable connected so that relative rotation between the first object and the body is inhibited.

2. An anti-rotation clip device as claimed in claim 1 wherein the first tang member extends from the spring band, and the flat end of the tang member is axially spaced apart from the clip and adapted to be received in a groove having a flat bottom on the body to prevent the first object from rotation and the device from axial movement relative to the body.

3. An anti-rotation clip device as claimed in claim 2 wherein the spring band includes a second tang member which is similar to the first tang member and diametrically opposed to the first tang member, adapted to engage a second groove having a flat bottom on the body to ensure the prevention of the first object from rotation and the device from axial movement relative to the body.

4. An anti-rotation clip device as claimed in claim 3 wherein the spring band includes two ends bent outwardly adapted to facilitate the lateral and forcible insertion of the polyhedral element on the first object through the circumferential open portion of the clip.

5. An anti-rotation clip device as claimed in claim 4 wherein the first and second tang members are circumferentially equally spaced apart from the respective bent ends of the spring band.

6. An anti-rotation clip device as claimed in claim 1 comprising a second clip made of a spring band forming a circumferentially discontinuous annulus having a circumferentially open portion of less than 180°, the second clip being connected in fixed relation to and axially spaced apart from the at least one clip, and co-axial about a common axis with the at least one clip, adapted to radially and forcibly grip a polyhedral element of a second object which is rotatably connected to the body when the polyhedral element is laterally and forcibly captured therein through the open portion of the second clip, so that rotation of the second object relative to the body is inhibited.

7. An anti-rotation clip device as claimed in claim 6 wherein a connection bar extends between the two spring bands at their middle portions to interconnect the two clips.

8. An anti-rotation clip device as claimed in claim 7 where in the two circumferentially discontinuous annuluses of the spring bands are individually and radially sized to the polydrical element of the respective first and second objects.

9. An anti-rotation clip device as claimed in claim 8 wherein the spring band of the respective at least one and second clips and the connection bar have a width substantially the same.

10. An anti-rotation clip device as claimed in claim 9 wherein the at least one clip includes a second tang member which is similar to the first tang member and diametrically opposed to the first tang member, adapted to engage a groove having a flat bottom on the body to ensure the prevention of the first and second objects from rotation and the device from axial movement relative to the body.

11. An anti-rotation clip device as claimed in claim 10 wherein the clips the tang members and the connection bar are made integrally.

12. An anti-rotation clip device comprising:

at least two spaced apart clips co-axial about a common axis, each clip forming a circular and circumferentially discontinuous annulus having a circumferentially open portion less than 180°, adapted to radially and forcibly grip a polyhedral element of a corresponding one of a first and a second objects when both the polyhedral elements of the first and second objects are laterally and forcibly captured through the respective open portions of the clips, and each clip being made of a spring band with ends bent outwardly to facilitate the insertion of the polyhedral element of the object;

a connection bar formed integrally with the spring bands rigidly interconnecting the two clips at their middle portions so that relative rotary and leaner movement between the two clips are restrained; and a pair of tang members fixed to and axially spaced apart from either one of the clips, the tang members being diametrically opposed and symmetrical about the connection bar, each tang member including a laterally and inwardly facing end, the end being flat along substantially its entire face, adapted to abut a flat surface on a body to which the first and second objects are rotatably connected so that relative rotation between each of the objects and the body is inhibited, two sides of each tang member being adapted to cooperate with two corresponding surfaces on the body to prevent the device from axial movement relative to the body.

13. An anti-rotation clip device as claimed in claim 12 wherein the tang members are formed integrally with the clip to which the tang members are fixed.

14. An anti-rotation clip member as claimed in claim 13 wherein the connection bar and the spring bands have a width substantially the same.

* * * * *

UNITED STATES PATENT AND TRADEMARK OFFICE
CERTIFICATE OF CORRECTION

PATENT NO.    : 6,322,306 B1
DATED         : November 27, 2001
INVENTOR(S)   : Colin George Dutton It is certified that error appears in the above-identified patent and that said Letters Patent is hereby corrected as shown below:

Column 6,
Line 50, delete "cirferentially" and insert -- circumferentially --
Line 59, delete "rotatable" and insert -- rotatably --

Signed and Sealed this

Fourth Day of June, 2002

Attest:

Attesting Officer

JAMES E. ROGAN
Director of the United States Patent and Trademark Office